(12) United States Patent
Cesnak et al.

(10) Patent No.: US 8,107,261 B2
(45) Date of Patent: Jan. 31, 2012

(54) POWERING UNIT WITH FULL BRIDGE AND WIDE ADJUSTING RANGE CIRCUIT

(75) Inventors: Lorand Cesnak, Vienna (AT); Markus Kogard, Hagenbrunn (AT)

(73) Assignee: Siemens Aktiengesellschaft, Munich (DE)

( * ) Notice: Subject to any disclaimer, the term of this patent is extended or adjusted under 35 U.S.C. 154(b) by 632 days.

(21) Appl. No.: 11/922,665

(22) PCT Filed: May 30, 2006

(86) PCT No.: PCT/EP2006/062704
§ 371 (c)(1),
(2), (4) Date: Mar. 9, 2009

(87) PCT Pub. No.: WO2007/003475
PCT Pub. Date: Jan. 11, 2007

(65) Prior Publication Data
US 2009/0213622 A1    Aug. 27, 2009

(30) Foreign Application Priority Data
Jun. 30, 2005   (DE) .................. 10 2005 030 601

(51) Int. Cl.
*H02M 3/335* (2006.01)
*H02H 7/122* (2006.01)
(52) U.S. Cl. ...................................... 363/17; 363/56.02
(58) Field of Classification Search ............... 363/16, 363/17, 56.01, 56.02, 56.05, 65, 71, 97, 98, 363/131, 132
See application file for complete search history.

(56) References Cited

U.S. PATENT DOCUMENTS

| 5,943,225 | A  | * | 8/1999 | Park | 363/53 |
| 7,466,565 | B2 | * | 12/2008 | Tanaka | 363/16 |
| 7,589,980 | B2 | * | 9/2009 | Aso | 363/17 |
| 2003/0185026 | A1 |  | 10/2003 | Matsuda et al. |  |
| 2009/0257247 | A1 | * | 10/2009 | Tada | 363/17 |

FOREIGN PATENT DOCUMENTS

| JP | 61189167 A | 8/1986 |
| JP | 04236165 A | 8/1992 |
| JP | 07 327366 A | 12/1995 |
| JP | 10248243 A | 9/1998 |
| SU | 1723643 A1 | 3/1992 |
| WO | 0394332 A1 | 11/2003 |
| WO | 03094332 A1 | 11/2003 |

OTHER PUBLICATIONS

Song-Yi Lin et al; "Analysis and Design for RCD Clamped Snubber used in Output Rectifier of Phase-Shift Full-Bridge ZVS Converters"; IEEE Transactions on Industrial Electronics, IEEE Service Center; Apr. 1998, vol. 45, No. 2; XP011023364; ISSN: 0178-0046; Piscataway, NJ, US. (Abstract). Baek J. W. et al; "Novel zero-voltage and zero-current-switching (ZVZCS) full bridge PWM converter with low output current ripple"; Telecommunications Energy Conference, 1997; Intelec 97, 19th International Melbourne, Vic., Australia; Oct. 19-23, 1997; pp. 257-262; XP010261362; ISBN: 0-7803-3996-7; New York, NY, US (Abstract).

* cited by examiner

Primary Examiner — Matthew Nguyen

(57) ABSTRACT

There is described a powering unit comprising at least one transformer, at least one full bridge circuit via which a primary winding of the transformer is connected to a direct current voltage input, a secondary winding for triggering an output circuit with an output direct current voltage via a bridge-type rectifier circuit as well as an output choke coil and an output capacitor, and a discharge circuit consisting a diode, for a capacitor and of a resistor for reducing the secondary-side peak voltages. The powering unit has another secondary winding, another bridge-type rectifier circuit and another discharge circuit operable to trigger the output circuit with part of the output direct current voltage via the output choke coil and the output capacitor. Thus, there are fewer losses in the resistors and the performance is enhanced.

9 Claims, 3 Drawing Sheets

Prior Art

POWERING UNIT WITH FULL BRIDGE AND WIDE ADJUSTING RANGE CIRCUIT

CROSS REFERENCE TO RELATED APPLICATIONS

This application is the US National Stage of International Application No. PCT/EP2006/062704, filed May 30, 2006 and claims the benefit thereof. The International Application claims the benefits of German application No. 10 2005 030 601.2 DE filed Jun. 30, 2005, both of the applications are incorporated by reference herein in their entirety.

FIELD OF INVENTION

The invention relates to a powering unit comprising at least one transformer, at least one full bridge circuit via which a primary winding of the transformer is connected to a direct current voltage input and a secondary winding for triggering an output circuit with a direct current voltage output via a bridge-type rectifier circuit as well as an output choke coil and an output capacitor, and a discharge circuit consisting of a diode, a capacitor and a resistor for reducing secondary-side peak voltages.

BACKGROUND OF INVENTION

The number of different designs of powering units has increased enormously in recent decades. The demands placed on powering units have at the same time also increased. Low error rates and a high degree of efficiency are the most important requirements here. A widespread design consists of switching powering units, which are typically smaller and lighter and produce less lost heat than linear powering units. To reduce the switching losses produced in the case of switching powering units and to limit current or voltage peaks, so-called discharge circuits according to the prior art, also known as snubber circuits, are used. Sensitive switching elements are thus protected and the EMC response improved.

Such discharge circuits generally consist of a capacitor as well as a diode and/or an inductor and if necessary a resistor.

In the case of switching powering units developed as full bridge converters, a discharge circuit is used in accordance with the prior art, in order to discharge parasitic voltage peaks, which develop during commutation processes, into the discharge circuit (see FIG. 1). In the case of full bridge converters having a constant input and output voltage, the discharge circuit can be designed according to the prior art such that almost all the energy stored in a capacitor of the discharge circuit is routed to an output capacitor and is thus not lost.

SUMMARY OF INVENTION

For full bridge converters having an input voltage range for connection to alternative energy generators for instance (fuel cells, photovoltaic elements), the design of a discharge circuit for current and voltage peak restriction is more difficult. In an output choke coil of the converter, a voltage develops during the time at which power is transmitted via the transformer, said voltage being dependent on the difference between the direct current voltage input multiplied by the translation ratio of the transformer and the direct current voltage output. This voltage then also supplies the discharge circuit, as a result of which the voltage in the capacitor of the discharge circuit increases past the direct current voltage output. In accordance with the prior art, this voltage difference allows the energy stored in the capacitor of the discharge circuit to only be dissipated over a resistor or released over a buck converter to the output capacitor. To keep the number of components and manufacturing costs low, a resistor is generally used here and the loss associated therewith is disregarded.

With the use of powering units for alternative energy sources it is however becoming ever more important, in order to optimize the overall degree of efficiency, to provide a large control range on the input side. The energy lost in the resistor of the discharge circuit is then no longer be disregarded.

An object underlying the invention is to specify an improvement of the prior art for a powering unit of the type mentioned in the introduction.

In accordance with the invention, this is carried out by a powering unit, consisting of at least one transformer, at least one full bridge circuit, by way of which a primary winding of the transformer is connected to an direct current voltage input, a secondary winding for triggering an output circuit with a direct current voltage output via a bridge-type rectifier circuit as well as an output choke coil and an output capacitor, and a discharge circuit consisting of a diode, a capacitor and a resistor for reducing secondary-side voltage peaks, with a further secondary winding, a further bridge-type rectifier circuit and a further discharge circuit being provided in order to trigger the output circuit with part of the output direct current voltage via the output choke coil and the output capacitor.

This arrangement of two secondary branches allows a significant reduction in the voltage difference dropping at the resistors within the critical upper input voltage range. The discharged energy of the voltages peaks produced by the switching processes is divided onto the two discharge circuits and thus reduces the charge of the capacitors in the discharge circuits. Less energy is thus lost in the two resistors and the level of efficiency of the powering unit increases.

In one refinement of the invention, a transformer is provided here with two secondary windings. The use of a single transformer advantageously affects the overall size and the manufacturing costs of the powering unit.

It is however also advantageous if two transformers are provided in each instance with a primary winding and a secondary winding and each of the two primary windings is connected to the direct current voltage input by way of a full bridge circuit. The use of two transformers allows the current ripple of the current through the input choke coil and the current ripple of the current through the output choke coil to be significantly less, thereby allowing for a significant reduction in the input-side and output-side filter.

It is also advantageous if the at least one full bridge circuit consists of four switches and if an electronic controller is provided for controlling said switches. The switches can then be controlled using a phase shift modulation, with it being possible to modulate the dead time.

It is also favorable to embody the switches as transistors, since these concern popular, more fail-safe switches.

BRIEF DESCRIPTION OF THE DRAWINGS

The invention is described by way of example below with reference to the appended Figures, in which.

DETAILED DESCRIPTION OF INVENTION

Figure 1:
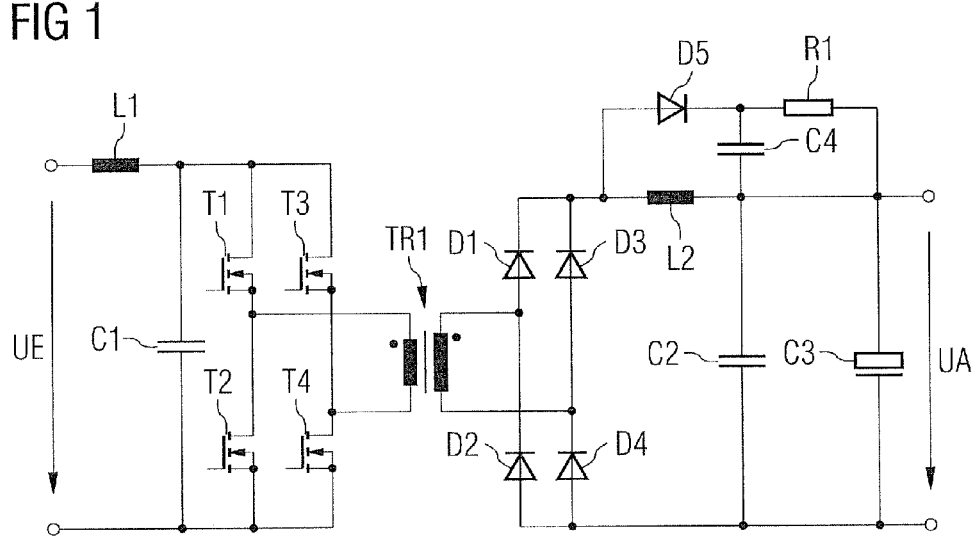
FIG. 1 shows a schematic illustration of a full bridge converter with a discharge circuit according to the prior art

FIG. 1 shows a powering unit as a full bridge converter having a secondary-side discharge circuit according to the prior art. On the primary side, a full bridge including four transistors T1, T2, T3 and T4 is connected to a direct current voltage input UE via an input choke coil L1 and an input capacitor C1. The outputs of the full bridge are connected to a primary winding of a transformer TR1. On the secondary side, a secondary winding wound in the same direction is arranged on the transformer TR1, to which secondary winding a bridge-type rectifier circuit is connected. The bridge-type rectifier circuit includes four diodes D1, D2, D3 and D4. An output circuit with an output direct current voltage UA is triggered via an output choke coil L2 and two output capacitors C2 and C3. The second output capacitor C2 is embodied here by way of example as a poled electrolyte capacitor.

Also arranged on the secondary side is a discharge circuit having a diode D5, a capacitor C4 and a resistor R1. In this process, the anode of the diode D5 is connected to the voltage output of the bridge-type rectifier circuit and the cathode of the diode D5 is connected to the capacitor C4 and the resistor R1 of the discharge circuit. The second terminals of the capacitor C4 and the resistor R1 are present on the direct current voltage output UA.

A current pulse is produced when the first transistor pair T1 and T4 is switched on. The rise in the pulse is restricted by the leakage inductance of the transformer TR1 and can be attributed back to the commutation processes and parasitic capacities of the conductive diodes D3 and D2. This current pulse produces an overshooting of the voltage on the output side. The voltage peak can adopt the twofold value of the direct current voltage input UE multiplied by the transmission ratio of the transformer TR1. This overvoltage is restricted by the discharge circuit. The specification of the passive components of the discharge circuit is dependent here both on the selected range of the direct current voltage input UE and also on the selected range of the direct current voltage output UA. When the second transistor pair T3 and T2 is switched on, a current pulse is also produced and the same processes run with the two conductive diodes D1 and D4.

The difference between the voltage developing in the capacitor C4 of the discharge circuit and the direct current voltage output UA drops at resistor R1. The losses which develop are greater here, the greater the voltage difference.

Figure 2:
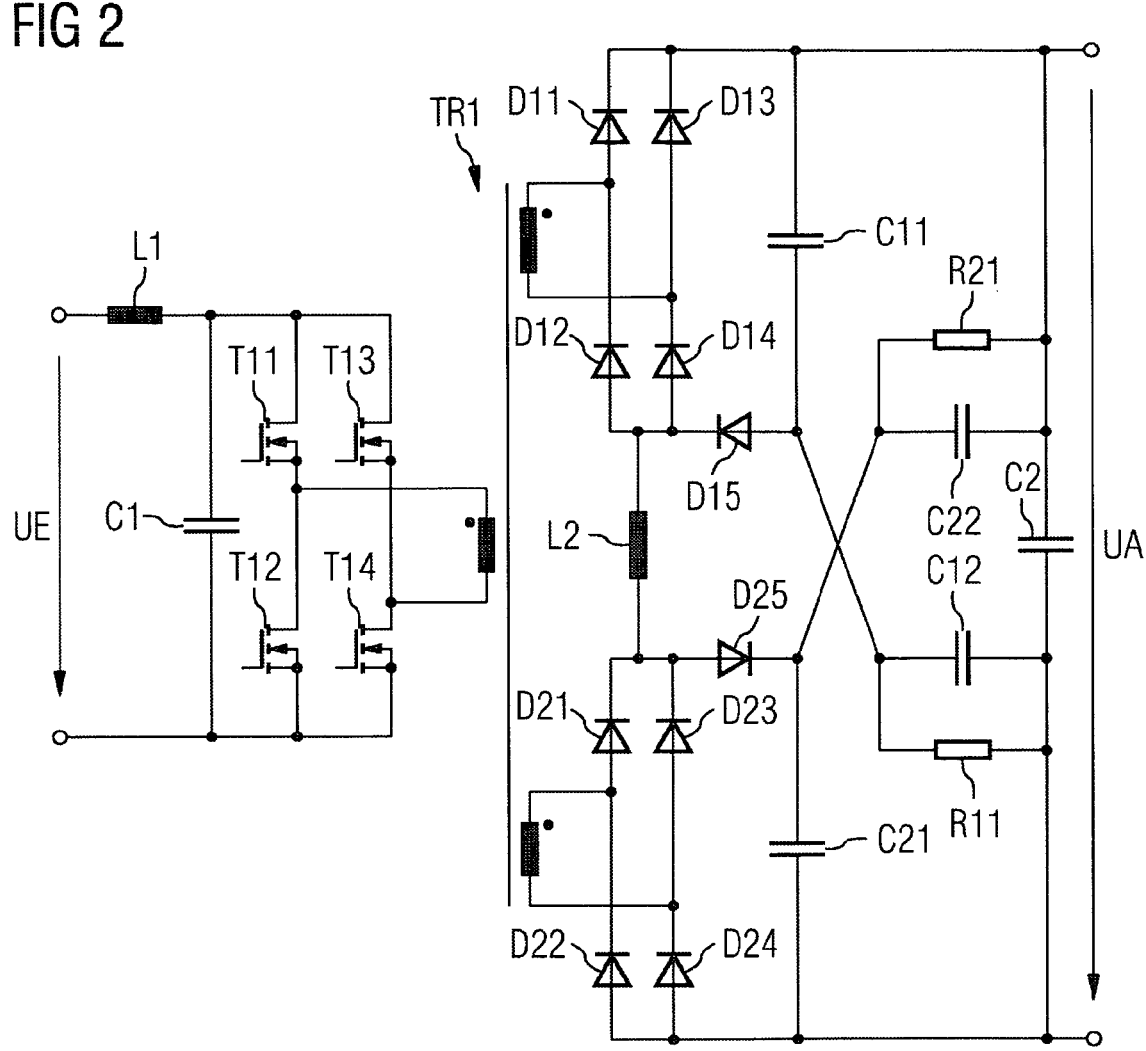
FIG. 2 shows a schematic illustration of a full bridge converter with a divided secondary winding

In an embodiment according to the invention shown by way of example in FIG. 2, a second secondary branch with a second discharge circuit is therefore arranged in order to reduce the voltage difference. On the primary side, the arrangement corresponds to that show in FIG. 1. On the secondary side, a divided secondary winding is provided on the transformer TR1, with both windings being connected to a bridge-type rectifier circuit. The first bridge-type rectifier circuit includes four diodes D11, D12, D13, and D14, similarly the second bridge-type rectifier circuit with the four diodes D21, D22, D23 and D24. The output choke coil L2 is arranged between the two bridge-type rectifier circuits in such a way that the outputs of the first bridge-type rectifier circuit are connected to a first terminal of the output choke coil L2 and the direct current voltage output UA and the outputs of the second bridge-type rectifier circuit are connected to a second terminal of the output choke coil L2 and a secondary-side reference potential.

As described in FIG. 1, output-side overvoltages also occur here as a result of current pulses. These are restricted by two discharge circuits arranged at the outputs of the bridge-type rectifier circuits. The first discharge circuit includes a diode D15, two capacitors C11 and C12 as well as a resistor R11. The cathode of diode 15 is connected to the anodes of diodes 12 and 14 of the bridge-type rectifier circuit. The anode of diode 15 is connected to the capacitors C11 and C12, with the second terminal of the first capacitor being connected to the direct current voltage output UA and the second terminal of the second capacitor C12 being connected to the secondary-side reference potential. The resistor R11 is arranged in parallel to the second capacitor C12.

The second discharge circuit likewise includes a diode 25, two capacitors C21 and C22 as well as a resistor R21. The anode of diode 25 is connected here to the cathodes of diodes D21 and D23 of the second bridge-type rectifier circuit. The cathode of diode 25 is connected to the two capacitors C21 and C22, with the second terminal of the first capacitor C21 being connected to the secondary-side reference potential and the second terminal of the second capacitor C22 being connected to the direct current voltage output UA. The resistor R21 is arranged in parallel to the second capacitor C22.

For both discharge circuits, it is the case here that each one of the two capacitors contained in the circuits can be omitted, without adversely affecting the function. The use of two capacitors per discharge circuit nevertheless allows the components to be attuned in a simpler fashion.

By comparison with the prior art, the exemplary arrangement produces lower losses in the resistors R21 and R11 for higher direct current voltage inputs UE, in which overvoltages are discharged into the discharge circuits, as the overvoltages divide onto the two discharge circuits.

Figure 3:
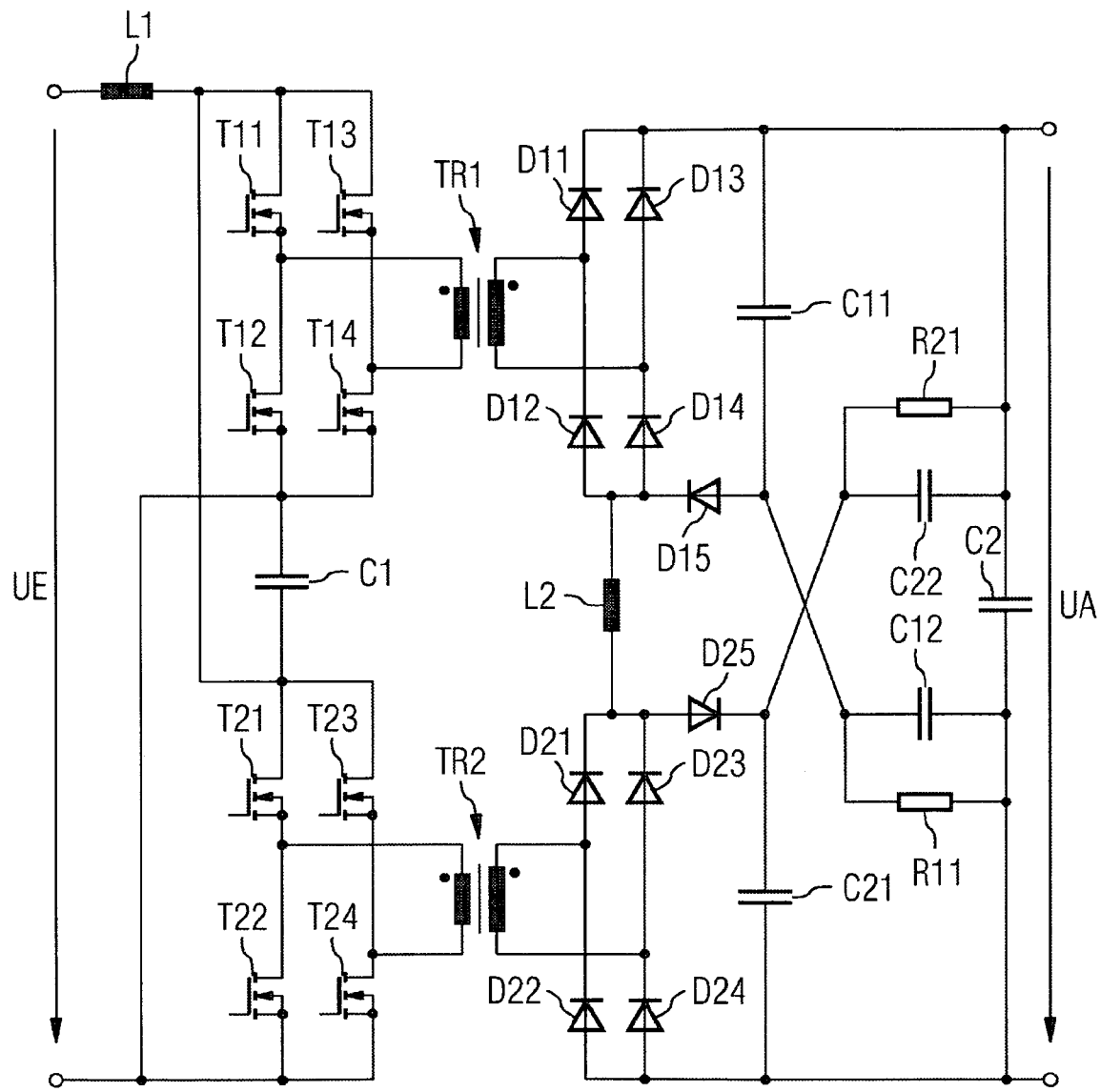
FIG. 3 shows a schematic illustration of a full bridge converter with two transformers

In the embodiment illustrated in FIG. 3, the secondary part corresponds to that in FIG. 2, the two secondary windings are however not arranged on a common transformer but instead on a transformer TR1 and TR2 in each instance. On the primary side, a primary winding of the first transformer TR1 is connected to a direct current voltage input UE by way of a full bridge circuit, consisting of four transistors T11, T12, T13 and T14, via an input choke coil L1. A primary winding of the second transformer TR2 is likewise connected to the direct current voltage input UE via a full bridge circuit, consisting of four transistors T21, T22, T23 and T24 via the input choke coil L1. A smoothing capacitor C1 is also arranged between the output of the input choke coil L1 and a primary side reference potential.

With this topology, the control pulses of the full bridge circuits are moved about 90° in respect of each other. In this way, the voltage peaks to be restricted by the discharge circuits form in a manner similar to that of a transformer with a divided secondary winding. Moving the control pulses nevertheless allows the output current ripple and the input current ripple to be significantly smaller, as a result of which smaller filter components can be used on the input side and on the output side.

With each of the two discharge circuits, a capacitor can be omitted here, without restricting the functionality.

The invention claimed is:
1. A powering unit, comprising:
a transformer;
a full bridge circuit, wherein a primary winding of the transformer is electrically connected to a direct current voltage input via the full bridge circuit;
a first secondary winding electrically connected to an output circuit for supplying an output direct current voltage via:
a first bridge-type rectifier circuit,
an output choke coil, and
an output capacitor;

a first discharge circuit comprising a diode, a capacitor and a resistor;

a second secondary winding electrically connected to the output circuit via:
- a second bridge-type rectifier circuit,
- the output choke coil, and
- the output capacitor;

a second discharge circuit comprising at least a diode and a resistor, wherein the second secondary winding, the second bridge-type rectifier circuit and the second discharge circuit supply a part of the output direct current voltage to the output circuit via the output choke coil and the output capacitor.

2. The powering unit as claimed in claim 1, wherein the powering unit comprises two transformers.

3. The powering unit as claimed in claim 1, further comprising:

a further transformer, wherein the transformer comprises the primary winding and the first secondary winding, wherein the further transformer comprises a further primary winding and the second secondary winding, and wherein each of the two primary windings are electrically connected to the direct current voltage input via a full bridge circuit.

4. The powering unit as claimed in claim 1, wherein the full bridge circuit includes four switches and an electronic controller for controlling the four switches.

5. The powering unit as claimed in claim 2, wherein the full bridge circuit includes four switches and an electronic controller for controlling the four switches.

6. The powering unit as claimed in claim 3, wherein the full bridge circuit includes four switches and an electronic controller for controlling the four switches.

7. The powering unit as claimed in claim 4, wherein the switches comprise transistors.

8. The powering unit as claimed in claim 5, wherein the switches comprise transistors.

9. The powering unit as claimed in claim 6, wherein the switches comprise transistors.

* * * * *